US007869351B2

(12) United States Patent
Ward et al.

(10) Patent No.: US 7,869,351 B2
(45) Date of Patent: Jan. 11, 2011

(54) COMMUNICATION TECHNIQUES AND GENERIC LAYER 3 AUTOMATIC SWITCHING PROTECTION

(75) Inventors: David D. Ward, Somerset, WI (US); Earl Hardin Booth, III, Raleigh, NC (US); Stefano Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 469 days.

(21) Appl. No.: 11/713,504

(22) Filed: Mar. 2, 2007

(65) Prior Publication Data

US 2008/0212610 A1  Sep. 4, 2008

(51) Int. Cl.
*G01R 31/08* (2006.01)
(52) U.S. Cl. ....................................... 370/228; 370/469
(58) Field of Classification Search .................. 370/469, 370/465, 466, 467, 401, 389, 392, 216, 225, 370/228, 242, 244
See application file for complete search history.

(56) References Cited

U.S. PATENT DOCUMENTS

| | | | |
|---|---|---|---|
| 6,594,228 B1* | 7/2003 | Naidoo et al. | 370/217 |
| 6,717,913 B1* | 4/2004 | Ghahremani et al. | 370/230 |
| 2004/0133690 A1* | 7/2004 | Chauffour et al. | 709/229 |
| 2006/0165074 A1* | 7/2006 | Modi et al. | 370/389 |
| 2006/0248191 A1* | 11/2006 | Hudson et al. | 709/226 |
| 2006/0274741 A1* | 12/2006 | Wing et al. | 370/389 |
| 2006/0291378 A1* | 12/2006 | Brotherston et al. | 370/221 |
| 2008/0198858 A1* | 8/2008 | Townsley et al. | 370/401 |

OTHER PUBLICATIONS

Biancuzzi, Federico, OpenBSD 3.8: Hackers of the Lost RAID, dated Oct. 20, 2005, pp. 1-4, http://onlamp.com.

* cited by examiner

*Primary Examiner*—Brian D Nguyen
(74) *Attorney, Agent, or Firm*—Brinks Hofer Gilson & Lione

(57) ABSTRACT

In one embodiment, software code in a respective computer system such as one or more data communication devices establishes multiple layer 2 network links between a first data communication device and a second data communication device. The first data communication device and the second data communication device include corresponding layer 3 interfaces enabling layer 3 network communications over each of the multiple layer 2 network links. The first and second data communication devices route traffic over one (e.g., a primary layer 2 link) of the multiple layer 2 network links using the layer 3 network communications. The private links are media independent. Upon detection of a failure associated with the primary layer 2 link, the data communication devices can automatically switch to sending traffic over a backup link of the multiple layer 2 network links without disrupting publicly advertised routing topology information.

20 Claims, 7 Drawing Sheets

_COMMUNICATION TECHNIQUES AND GENERIC LAYER 3 AUTOMATIC SWITCHING PROTECTION_

BACKGROUND

One implementation of Automatic Protection Switching (APS) includes using a "protect" POS (Packet Over Synchronous Optical Network/Synchronous Digital HierarchyPacket Over) interface in a SONET (Synchronous Optical Networking) network as a backup for a "working" POS interface. When the working interface fails, the backup POS interface quickly assumes the failing interface's traffic load.

According to a conventional primary/backup configuration, the two circuits can be terminated in the same router, or in different routers. For example, a first router (e.g., router A) can be configured with a "working" interface. A second router (e.g., router B) can be configured with the "protect" (e.g., backup) interface. If the working interface on router A becomes unavailable, the connection automatically switches over to the protect interface on router B. Conventional techniques enable implementing APS, as discussed above, using network layer 2 interfaces in respective routers.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION OF EXAMPLE EMBODIMENTS

Overview:

In a general embodiment as discussed in more detail below, software code in a respective computer system such as one or more data communication devices (e.g., routers, etc.) supports establishing multiple layer 2 network links between a first data communication device and a second data communication device. The first data communication device and the second data communication device include corresponding layer 3 interfaces enabling layer 3 network communications over each of the multiple layer 2 network links. The first and second data communication devices route traffic to each other, in the absence of a failure, over one (e.g., a primary layer 2 link) of the multiple layer 2 network links using the layer 3 network communications. Upon detection of a failure associated with the primary layer 2 link, the data communication devices can switch to sending traffic over a backup link having corresponding layer 3 terminal interfaces in each data communication device.

These and related embodiments will be discussed in more detail below.

DETAILED DESCRIPTION

The present disclosure includes novel techniques for enabling APS on any pairings of L3 communication interfaces (e.g., physical ports, virtual interfaces, virtual local area networks, etc.). Thus, embodiments described herein provide APS redundancy and support the ability to have finer granularity of communications than merely at a physical port level. A publicly advertised link continues to operate properly (e.g., a network topology is still valid) as long as at least one of the primary or backup links continue to work properly.

Embodiments herein enable transmission of different media on each of the redundant links. For example, one link (of an active/backup link pair) can be configured to transmit according to ATM (Asynchronous Transfer Mode) while the other link can be configured to transmit data according to SONET (Synchronous Optical Networking).

Embodiments herein therefore provide greater flexibility than conventional methods, which require APS-enabled transmission using the same protocol such as SONET, ATM, Etherchannel, Frame Relay, etc. on each link.

Figure 1:
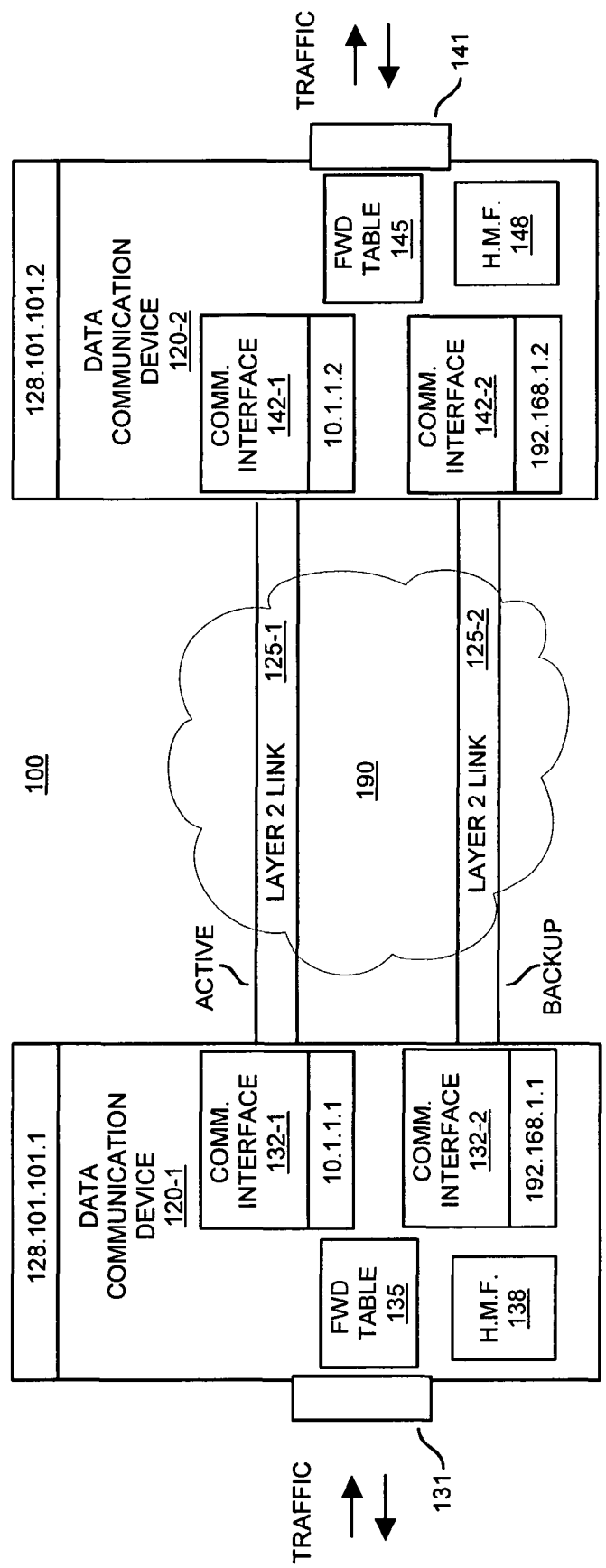
FIG. 1 is a diagram illustrating an example communication system according to embodiments herein.

FIG. 1 is a block diagram of an example communication environment 100 enabling communications according to embodiments herein. In general, data communication devices 120 have corresponding assigned publicly advertised addresses to route data in a respective network environment. Redundant links 125 (e.g., an active and backup link) are assigned private addresses (e.g., non-advertised addresses) to enable point-to-point communications between data communication devices such as routers in a network environment.

In the context of the present example, computer environment 100 includes data communication device 120-1 and data communication device 120-2. Data communication device 120-1 is assigned a publicly advertised address 128.101.101.1 and includes layer 3 communication interface 132-1 and layer 3 communication interface 132-2 as well as forwarding table 135 and health monitoring function 138.

Data communication device 120-2 is assigned a publicly advertised address 128.101.101.2 and includes layer 3 communication interface 142-1 and layer 3 communication interface 142-2 as well as forwarding table 145 and health monitoring function 148.

Layer 2 link 125-1 such as a VLAN enables point-to-point communications between layer 3 communication interface 132-1 and layer 3 communication interface 142-1. Layer 2 link 125-2 enables point-to-point communications between layer 3 communication interface 132-2 and layer 3 communication interface 142-2.

According to one embodiment, communication environment 100 supports a "generic protected interface." While APS can be implemented in conventional domains as mentioned above, such a solution is typically specific to layer 2 encapsulation, i.e. Sonet APS, Etherchannel, etc.

As will be discussed herein, a generic APS scheme uses BFD (Bidirectional Forwarding Detection) sessions on the member-links (e.g., layer 2 link 125-1 and layer 2 link 125-2). BFD is a protocol intended to detect faults in the bidirectional path between two forwarding engines (e.g., data communication devices 120), including physical interfaces, subinterfaces, data link(s), and to the extent possible the forwarding engines themselves, with potentially very low latency. It operates independently of media, data protocols, and routing protocols. BFD can be used to detect "activity" over any media, at any protocol layer, with a wide range of detection times and overhead. Since BFD runs on top of IP (Internet Protocol), the mechanism is generic to any layer 2 interface.

Implementing BFD sessions (or other error detection method) on layer 2 links provides fault detection and enables fast convergence in the event of a failure. For example, implementing use of one or more BFD sessions, faults can be detected on the order of 50 milliseconds.

As shown in FIG. 1, communication environment 100 includes the creation of a configuration abstraction (e.g., a "logical interface") that contains two layer 3 component interfaces. The layer 3 interfaces can be virtual interfaces such as aVLANs.

As mentioned, component interfaces (e.g., layer 2 links 125) can support any type of layer 2 encapsulation. That is, the type of layer 2 encapsulation used on layer 2 link 125-1 need not match the layer 2 type of encapsulation used on layer 2 link 125-2. For example, layer 2 link 125-1 can support ATM communications while layer 2 link 125-2 can support SONET communications, layer 2 link 125-1 can support Etherchannel while layer 2 link 125-2 supports ATM, and so on. Other pairings are possible. Accordingly, embodiments herein support establishing a first layer 2 network link (e.g., link 125-1) between a first data communication device 120-1 and a second data communication device 120-2 to support communications according to a first communication protocol type and establishing a second layer 2 link 125-2 between the first data communication device 120-1 and the second data communication device 120-2 to support communications according to a second communication protocol type.

Note that each of layer 2 links 125 can also be configured to support communications according to the same protocol. For example, layer 2 link 125-1 can support ATM communications while layer 2 link 125-2 also supports ATM communications, layer 2 link 125-1 can support Etherchannel while layer 2 link 125-2 also supports Etherchannel, and so on.

According to one embodiment, the interfaces (e.g., layer 3 communication interfaces 132 and layer 3 communication interfaces 142) are capable of running both IP and BFD sessions.

By default a drop filter is installed on the redundant layer 2 links 125 (e.g., VLANs) except for BFD and other L2 protocols. In one embodiment, no routing protocol is used to communicate data between the (L3 communication) interfaces.

The logical interface infrastructure of communication environment 100 automatically bootstraps BFD to run on both layer 2 links 125 (as the failure detection mechanism).

If a user happens to supply configuration information with respect to one of the logical interfaces, the logical interface infrastructure has the responsibility for propagating the feature configuration (QoS, ACL, PBR, Netflow, etc) to the pair of member interfaces. If a bundle (e.g., a respective layer 3 communication interface) is enabled for subscriber functionality, then the subscriber state should be mirrored across the pair of interfaces for a respective link 125.

Any subscriber, service or session state that is created on the active layer 2 link 125-1 can be transferred to the redundant layer 2 link 125-2 and corresponding layer 3 communication interface pairing.

Upon failure detection on the active layer 2 link 125-1, the redundant layer 2 link 125-2 default drop filter is removed on the initiator, and it then becomes the active link. Because it has all the configuration previously installed and all sub-scriber/service/session state, the operator sees no loss (or maximally the time to detect the failure and remove the filter—less than 50 ms). Based on execution of one or more BFD sessions or other link monitoring function, both data communication devices 120 and corresponding interfaces will be made aware of a failure on layer 2 link 125-1 if one happens to occur.

In one embodiment, IP is enabled on the member links 125 for the purpose of running BFD session. The layer 3 communication interfaces 132 and 142 are not seen from a RIB (Routing Information Database) and FIB (Forwarding Information Base) perspective. The member links can be just part of the layer 2 adjacency which is created when routes are installed against the bundle interfaces.

Functionality supported by data communication devices 120 and communication environment will now be discussed in FIGS. 2-4. For purposes of this discussion, the data communication device 120 or a corresponding function associated with the data communication device 120 generally perform steps in the flowcharts. Note that the functionality associated with data communication device 120 can be extended to the other entities as well. Also, note that the steps in the below flowcharts need not always be executed in the order shown.

Figure 2:
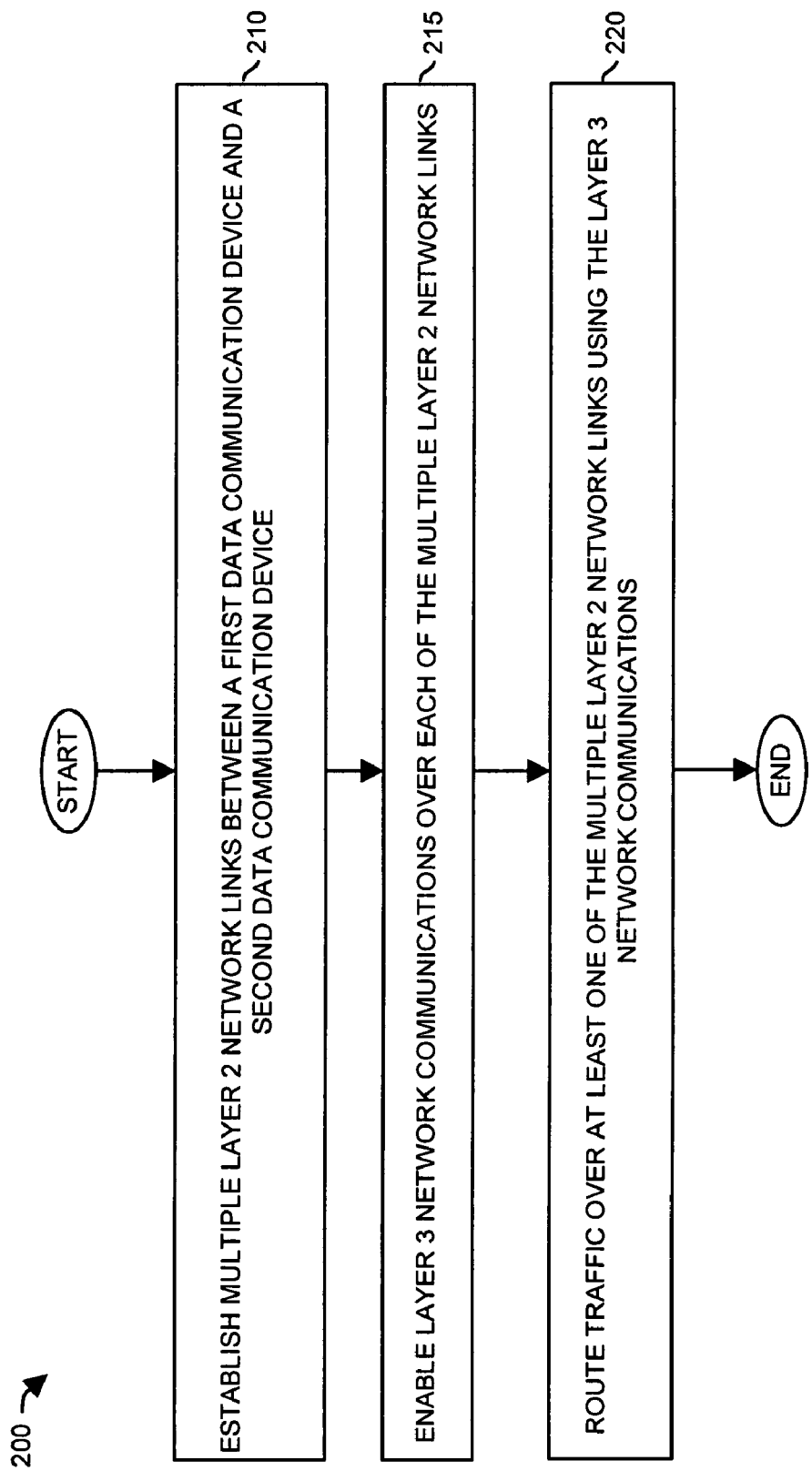
FIG. 2 is a flowchart illustrating an example method of enabling communications according to embodiments herein.

Now, more particularly, FIG. 2 is a flowchart 200 illustrating an example of a novel technique for supporting communications in communication environment 100 according to embodiments herein. Note that techniques discussed in flowchart 200 overlap and summarize some of the techniques discussed above.

In step 210, the data communication device 120-1 establishes multiple layer 2 network links 125 between data communication device 120-1 and data communication device 120-2.

In step 215, the data communication device 120-1 enables layer 3 network communications over each of the multiple layer 2 network links 125.

In step 220, the data communication device 120-1 routes traffic over at least one of the multiple layer 2 network links 125 using the layer 3 network communications such as SONET, ATM, Etherchannel, etc.

Figure 3:
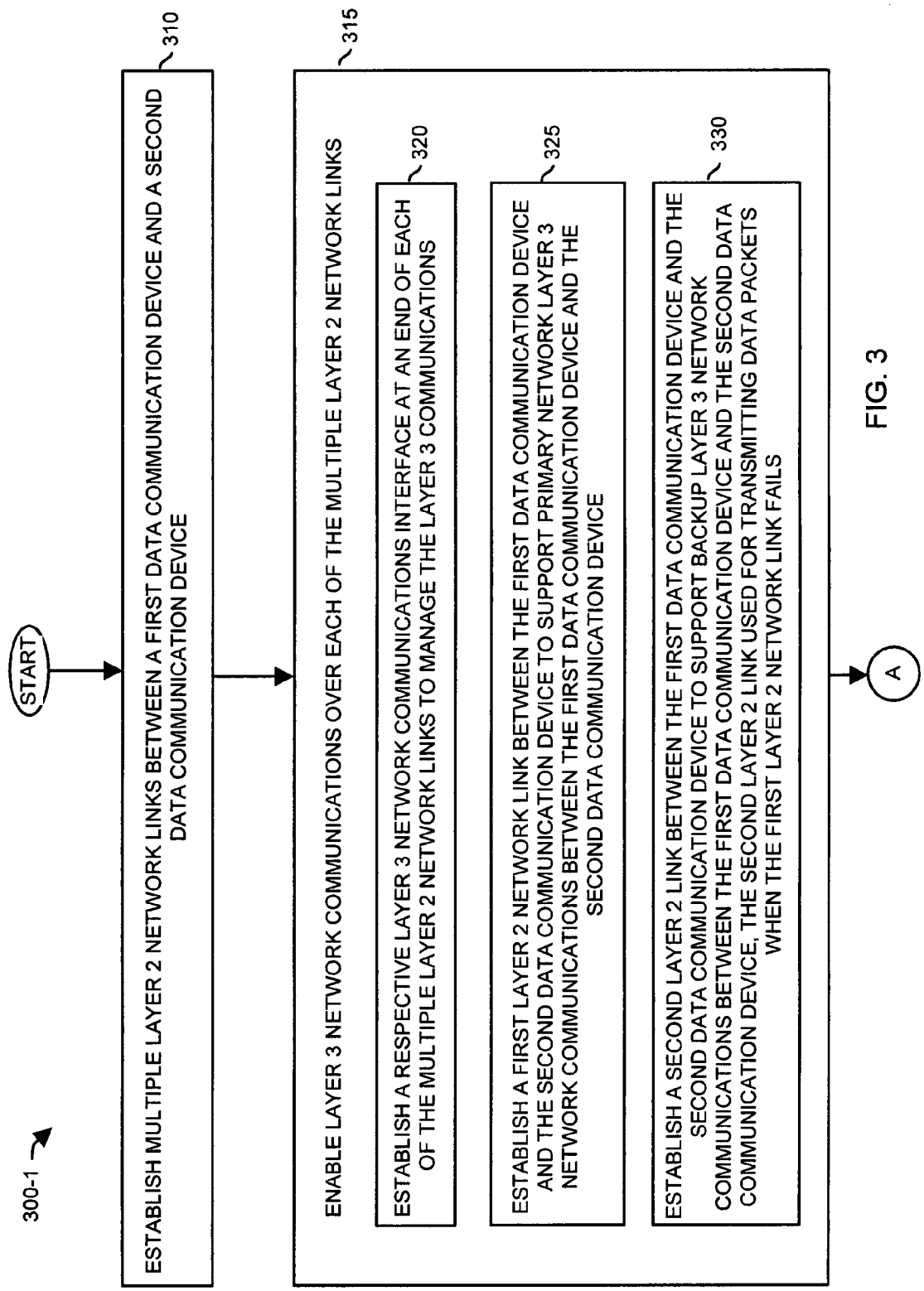
FIGS. 3 and 4 combine to form an example flowchart illustrating configuring a communication system according to embodiments herein.
Figure 4:
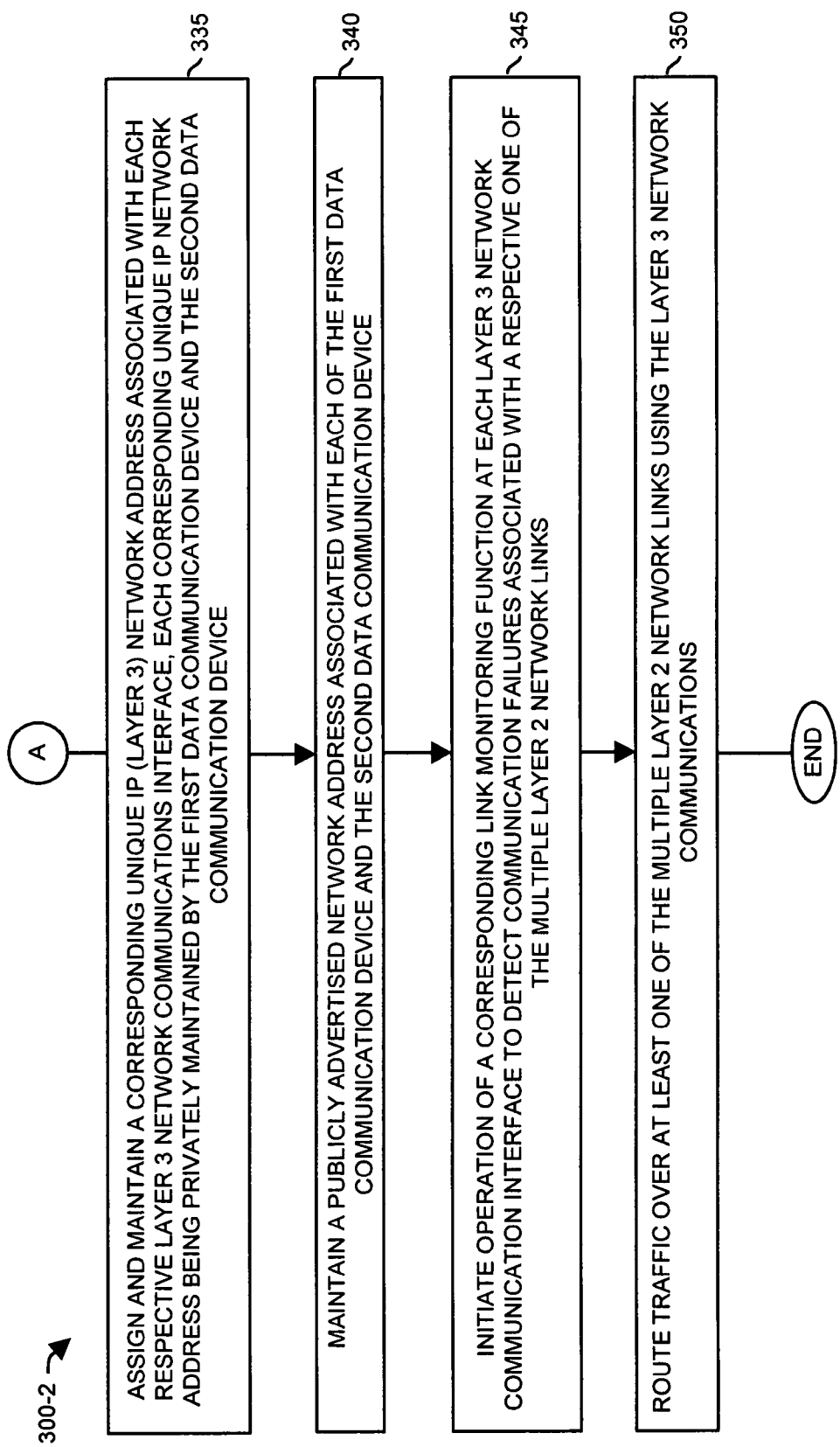

FIGS. 3 and 4 combine to form a flowchart 300 (e.g., flowchart 300-1 and flowchart 300-2) illustrating example processing steps associated with communication environment 100 according to an embodiment herein. Note that techniques discussed in flowchart 300 overlap with the techniques discussed above in the previous figures.

In step 310, the data communication devices 120 establish multiple layer 2 network links 125 between data communication device 120-1 and data communication device 120-2.

In step 315, the data communication devices 120 enable layer 3 network communications over each of the multiple layer 2 network links. This can be achieved via the sub-steps described below.

In sub-step 320 of step 315, the data communication devices 120 establish a respective layer 3 network communications interface at an end of each of the multiple layer 2 network links 125 to support the layer 3 communications.

In sub-step 325 of step 315, the data communication devices 120 maintain layer 2 network link 125-1 between data communication device 120-1 and data communication device 120-2 to support primary network layer 3 network communications.

In sub-step 330, the data communication devices 120 maintain layer 2 link 125-2 to support backup layer 3 network communications between the data communication device 120-1 and data communication device 120-2. As previously discussed, the layer 2 link 125-2 is used for transmitting data packets when the first layer 2 network link fails.

Note that embodiments herein can be extended to include a first set of multiple primary links 125 on which to transmit data traffic between each other and a second set of backup links 125 supporting backup communications in the event that one or more of the primary links happens to fail.

In step 335, the data communication devices 120 allocate and maintain corresponding unique IP (layer 3) network addresses associated with each respective layer 3 network communications interface. As previously discussed, in one embodiment, the corresponding unique IP network addresses associated with the layer 3 communication interfaces are privately maintained by the data communication devices 120.

For example, layer 3 communication interface 132-1 is assigned an address of 10.1.1.1, layer 3 communication interface 142-1 is assigned an address of 10.1.1.2, layer 3 communication interface 132-2 is assigned an address of 192.168.1.1, and layer 3 communication interface 132-2 is assigned an address of 192.168.1.2. In one embodiment, the addresses are only known by data communication device 120-1 and data communication device 120-2 without advertising to other neighboring routers.

In step 340, the data communication devices 120 maintain a publicly advertised network address associated with each of the first data communication device and the second data communication device. For example, data communication device 120-1 has an associated network address of 128.101.101.1; data communication device 120-2 has an associated network address of 128.101.101.2. These addresses are publicly advertised to neighboring routers and are still valid even though one of links 125 may go down.

In step 345, the data communication devices 120 initiate operation of a corresponding link monitoring function (e.g., a BFD session) at each layer 3 network communication interface to detect communication failures associated with a respective layer 2 network link 125.

In step 350, based on a health status of links 125, the data communication devices 120 route traffic over the layer 2 links 125 using the layer 3 network communications. An example of routing data packets is more particularly discussed with respect to FIGS. 5 and 6.

Figure 5:
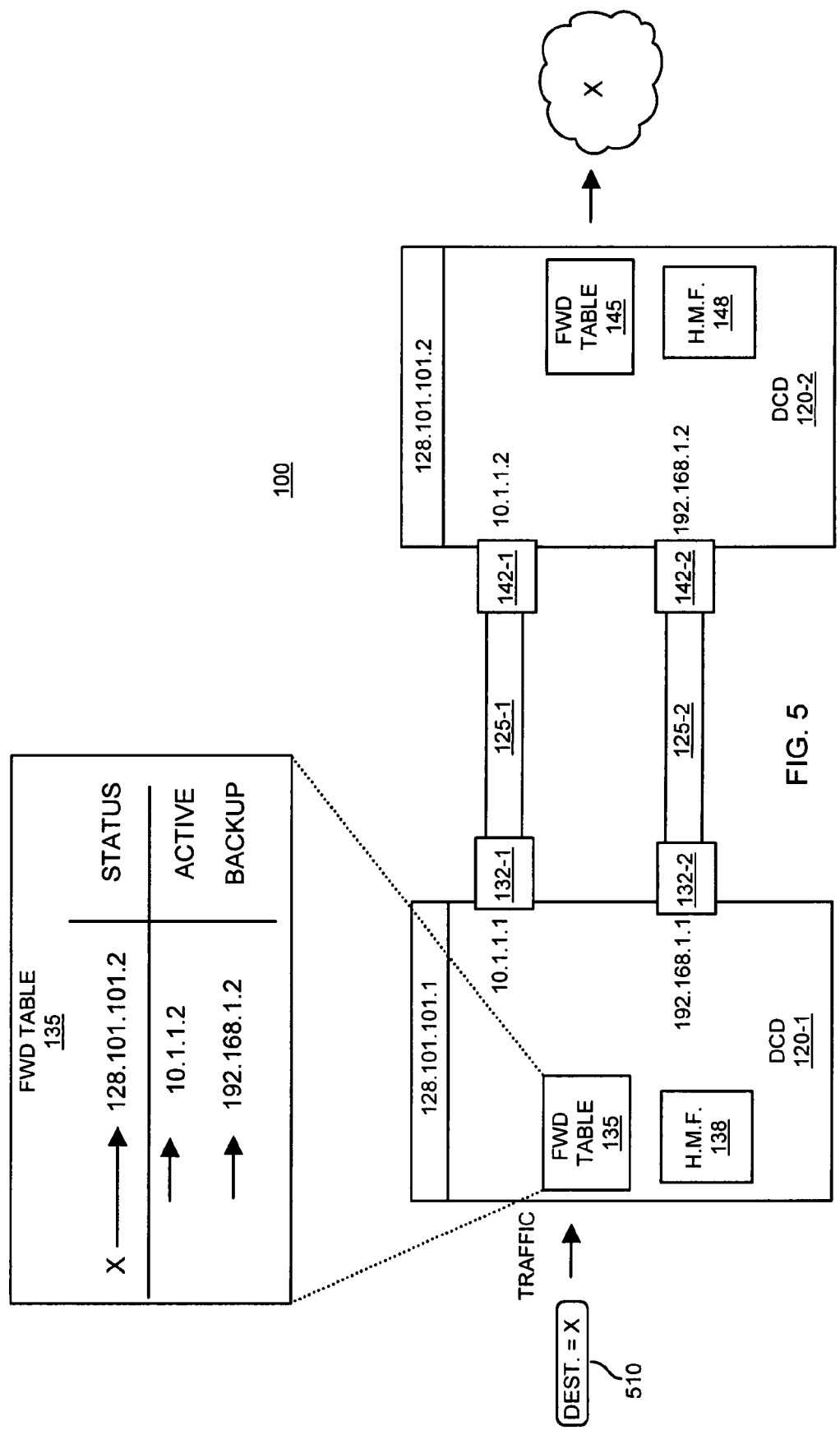
FIG. 5 is a diagram illustrating an example using a forwarding table according to embodiments herein.

FIG. 5 is an example diagram of computer environment 100 illustrating forwarding of a data packet 510 according to embodiments herein. As shown, data communication device 120-1 includes forwarding table 135. Upon receipt of a respective data packet 510 being routed to a target destination X, the data communication device 120-1 looks for an appropriate entry in the forwarding table 135 to identify how to route the received data packet 510.

In this example, forwarding table 135 indicates to route the received data packet 510 to data communication device 120-2, which has a publicly advertised address=128.101.101.2. For the given entry used to route the data packet 510 to destination X, in lieu of forwarding the data packet using the address 128.101.101.2, forwarding table 135 indicates that there are two private addresses for potentially forwarding the data packet 510. For example, network address 10.1.1.2 and 192.168.1.2 are both candidates for forwarding corresponding data packet 510.

In the context of the present example (since the status of address 10.1.1.2. is currently the ACTIVE link for forwarding data), the data communication device 120-1 chooses address 10.1.1.2 as a target address on which to forward the data packet 510 via layer 3 communication interface 132-1 over layer 2 link 125-1 to layer 3 communication interface 142-1 of data communication device 120-2.

As previously discussed, the data communication devices 120-1 can initiate operation of a health monitor function 138 (e.g., a BFD session or some other monitor function) in order to detect the occurrence of failures on links 125. In this example, no errors have been currently detected on link 125-1. Therefore, forwarding table 135 specifies that address 10.1.1.2 is the active channel.

However, in response to detecting a failure on link 125-1 via a health monitoring function, the data communication device 120-1 automatically updates the forwarding table 135 to indicate that address 192.168.1.2 is now the active channel instead of address 10.1.1.2. Updating the forwarding table 135 in this way provides automatic protection switching in the event of a failure because data communication device 120-1 automatically forwards received data packets on a non-failing channel.

Accordingly, embodiments herein enable reception of a data packet 510 at a data communication device 120-1; identifying that the data packet 510 can be transmitted through data communication device 120-2 to a remote network address X as specified by the data packet 510 based on use of forwarding table 135; and selective forwarding of the data packet 510 from a layer 3 network communication interface 132-1 of data communication device 120-1 over a corresponding one (e.g., a currently ACTIVE one) of the layer 2 network links 125 (e.g., a dedicated link including one or more physical links, router nodes, etc.) to a layer 3 network communication interface 142 associated with data communication device 120-2.

In a similar way as discussed above, note that data communication device 120-2 can route received data packets in a reverse direction over corresponding private links 125 through data communication device 120-1 to other target destinations.

As previously discussed, each of the multiple layer 2 network links 125 herein can be configured according to a point-to-point mode in which each respective layer 2 link is not a shared media for broadcasting data.

Figure 6:
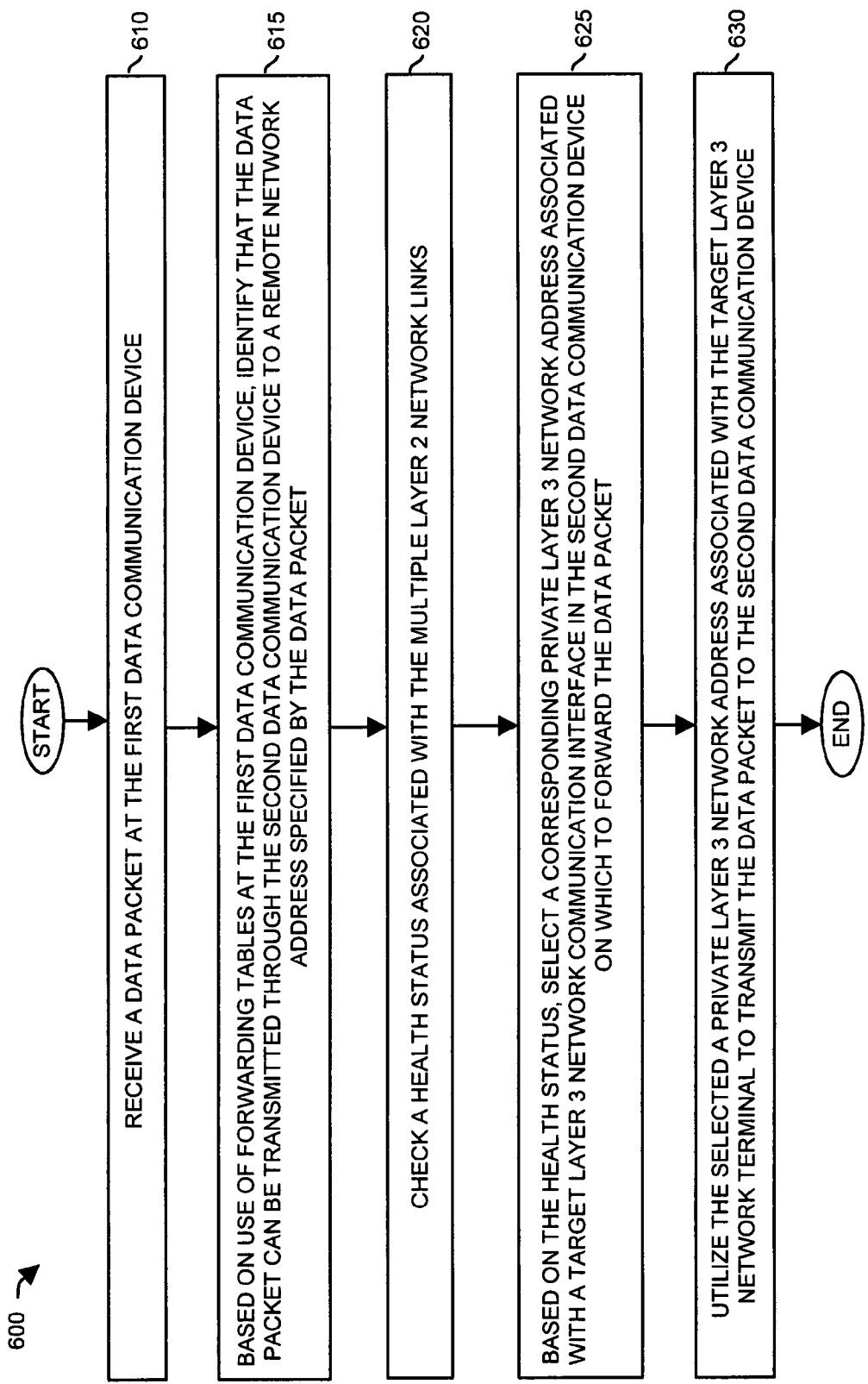
FIG. 6 is a flowchart illustrating an example method of forwarding communications according to embodiments herein.

FIG. 6 is a flowchart 600 illustrating an example technique of supporting communications according to embodiments herein. Note that techniques discussed in flowchart 600 overlap and summarize some of the techniques discussed above with respect to FIG. 5.

In step 610, data communication device 120-1 receives a data packet 510.

In step 615, based on use of forwarding tables (e.g., forwarding table 135) at the first data communication device 120-1, the data communication device 120-1 identifies whether the data packet 510 can be transmitted through the second data communication device 120-2 to a remote network address (e.g., destination X) specified by the data packet 510. As shown in FIG. 5, the entry in forwarding table 135 indicates that data communication device 120-2 having address 128.101.101.2 is an appropriate router on which to forward the data packet 510. However, the data communication device 120-1 does not use address 128.101.101.2 to forward the data packet 510 to data communication device 120-2.

In step 620, data communication device 120-1 utilizes a health status associated with the multiple layer 2 network links to update the forwarding table 135 and therefore make routing decisions.

In step 625, based on the health status of links 125 as specified in the forwarding table 135, data communication device 120-1 selects a corresponding private layer 3 network address (e.g., address 10.1.1.2) associated with a target layer 3 network communication interface 142-1 on which to forward the data packet 510.

In step 630, the data communication device 120-1 utilizes the selected private layer 3 network address (e.g., 10.1.1.2) associated with the target layer 3 network terminal to transmit the data packet 510 to data communication device 120-2 instead of using 128.101.101.2 as a routing address.

Figure 7:
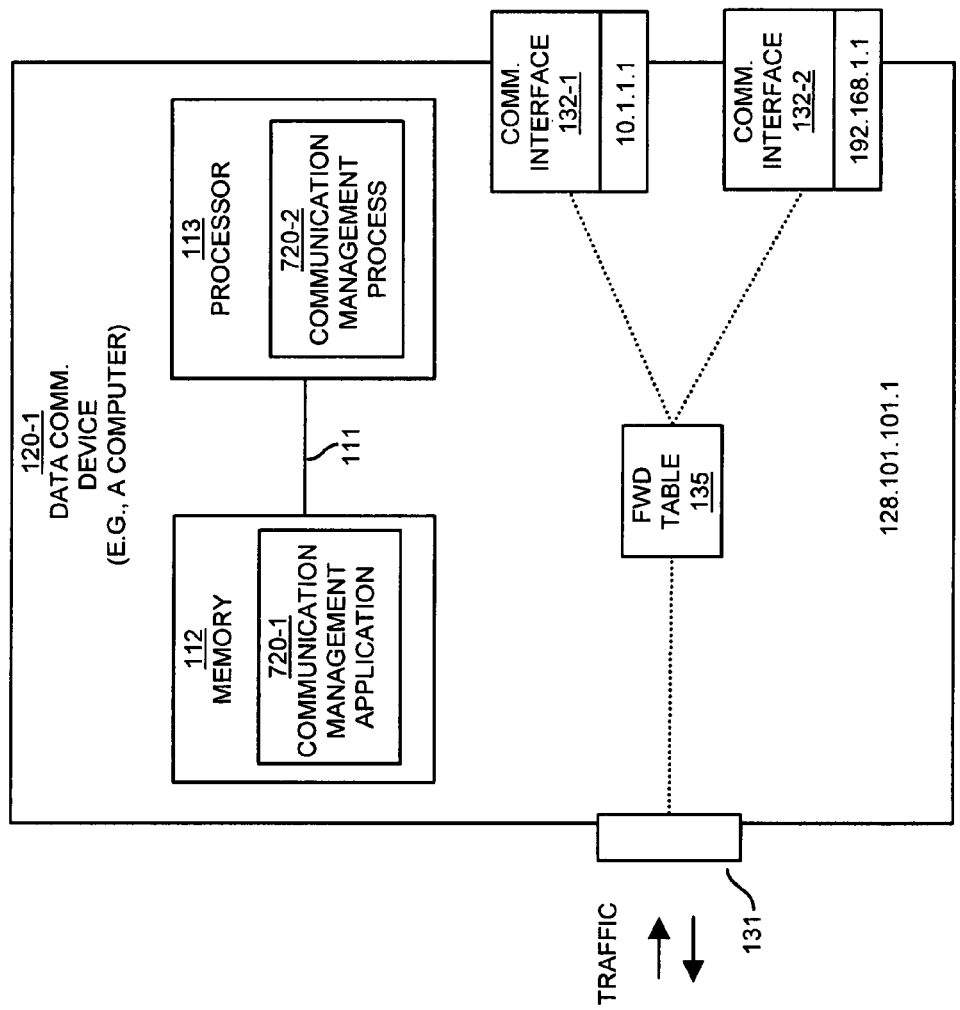
FIG. 7 is a diagram of an example platform for use in a communication environment according to embodiments herein.

FIG. 7 is a block diagram illustrating an example data communication device 120 for executing a communication management application 720-1 and other related processes according to embodiments herein. The communication management application 720-1 can support any of the functionality as described herein.

Data communication device 120 can be a computerized device or include a computer system such as a personal computer, workstation, portable computing device, console, processing device, etc.

As shown, data communication device 120-1 of the present example includes an interconnect 111 that couples a memory system 112 and a processor 113. Communication interfaces (e.g., 131, 132-1, 132-2) enable data communication device to route data traffic to and from different sources.

As shown, memory system 112 is encoded with communication management application 720-1 to perform the different functions as described herein. Functionality (such as communication management application 720-1) associated with data communication device 120-1 can be can be embodied as software code such as data and/or logic instructions (e.g., code stored in the memory or on another computer readable medium such as a disk) that, when executed, support functionality according to different embodiments described herein.

During operation, processor 113 of data communication device 120-1 accesses memory system 112 via the interconnect 111 in order to launch, run, execute, interpret or otherwise perform the logic instructions of the communication management application 720-1. Execution of application 720-1 produces processing functionality in communication management process 720-2. In other words, the communication management process 720-2 represents one or more portions of the communication management application 720-1 (or the entire application) performing within or upon the processor 113 in the data communication device 120-1.

It should be noted that, in addition to the communication management process 720-2, embodiments herein include the communication management application 720-1 itself (i.e., the un-executed or non-performing logic instructions and/or data). The communication management application 720-1 and/or communication management application 720-1 can be stored on a computer readable medium such as a floppy disk, hard disk, or optical medium. The communication management application 720-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of communication management application 720-1 in processor 113 as the communication management process 720-2. Those skilled in the art will understand that the data communication device 120-1 can include other processes and/or software and hardware components, such as an operating system that controls allocation and use of hardware resources associated with the data communication device 120-1.

As discussed above, techniques herein are well suited for use in applications such as those that support communications in a network environment. However, it should be noted that configurations herein are not limited to such use and thus configurations herein and deviations thereof are well suited for use in other environments as well.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

We claim:

1. A method comprising:
   establishing multiple layer 2 network links between a first data communication device and a second data communication device;
   enabling layer 3 network communications over each of the multiple layer 2 network links by establishing a plurality of layer 3 network communications interfaces in the first data communication device, each respective one of the layer 3 network communication interfaces for communication over a corresponding one of the multiple layer 2 network links;
   assigning by the first data communication device a plurality of layer 3 network addresses to the layer 3 network communications interfaces, each one of the layer 3 network communications interfaces being assigned a different one of the layer 3 network addresses than the other layer 3 network communications interfaces;
   monitoring a health status of the multiple layer 2 network links by executing a BFD (Bidirectional Forwarding Detection) session in the first data communication device, the BFD session communicating over the layer 3 network communications interfaces using a BFD protocol, the BFD protocol being a protocol for fault detection;
   updating a forwarding table in the first data communication device to route any traffic to the second data communication device over at least one backup layer 3 network communications interface instead of over at least one primary layer 3 network communications interface in response to detecting a failure in at least one of the multiple layer 2 network links with the BFD session, the at least one primary layer 3 network communications interface being for communication over the at least one of the multiple layer 2 network links, the layer 3 network communications interfaces including the at least one backup layer 3 network communications interface and the at least one primary layer 3 network communications interface, the forwarding table identifying how to route traffic received by the first data communication device from a network;
   receiving at least one data packet from a third data communication device at the first data communication device;
   identifying by the first data communication device whether the at least one data packet is routable through the second data communication device to a remote device based on the forwarding table, the remote device being identified by a remote network address in the at least one data packet; and routing the at least one data packet by the first data communication device over at least one backup layer 3 network communications interface based on the forwarding table, wherein routing the at least one data packet includes:

selecting a private layer 3 network address associated with a target layer 3 network communication interface in the second data communication device from the forwarding table, the private layer 3 network address being associated with the second data communication device and the at least one backup layer 3 network communications interface in the forwarding table, the layer 3 network addresses including the private layer 3 network address; and forwarding the at least one data packet to the private layer 3 network address from the at least one backup layer 3 network communications interface over a corresponding one of the layer 2 network links to the target layer 3 network communication interface at the second data communication device.

2. A method as in claim 1 further comprising:
maintaining a plurality of unique Internet Protocol (IP) network addresses as private to the first data communication device and the second data communication device, the layer 3 network addresses including the unique IP network addresses, the unique IP network addresses including the private layer 3 network address.

3. A method as in claim 1, wherein enabling layer 3 network communications over each of the multiple layer 2 network links includes:

establishing a first layer 2 network link between the first data communication device and the second data communication device to support primary network layer 3 network communications between the first data communication device and the second data communication device, the at least one of the multiple layer 2 network links including the first layer 2 network link; and establishing a second layer 2 network link between the first data communication device and the second data communication device to support backup layer 3 network communications between the first data communication device and the second data communication device, the second layer 2 network link used for transmitting data packets when the first layer 2 network link fails, the multiple layer 2 network links including the second layer 2 network link, wherein the at least one backup layer 3 network communications interface is for communication over the second layer 2 network link.

4. A method as in claim 1 further comprising:
maintaining the layer 3 network addresses as private layer 3 network addresses; and
maintaining a publicly advertised network address associated with each of the first data communication device and the second data communication device.

5. A method as in claim 1, wherein selecting the private layer 3 network address includes:
checking the health status associated with the multiple layer 2 network links in the forwarding table;
based on the health status in the forwarding table, identifying that the corresponding one of the layer 2 network links is operating properly for transmission of the at least one data packet over the corresponding one of the multiple layer 2 network links; and
selecting the private layer 3 network address associated with the corresponding one of the layer 2 network links.

6. A method as in claim 1, wherein establishing the multiple layer 2 network links between the first data communication device and the second data communication device includes:
establishing a first layer 2 network link between the first data communication device and the second data communication device to support communications between the first data communication device and the second data communication device according to a first communication protocol type; and
establishing a second layer 2 network link between the first data communication device and the second data communication device to support communications between the first data communication device and the second data communication device according to a second communication protocol type.

7. A method as in claim 1 further comprising:
monitoring an ability of the multiple layer 2 network links to forward traffic.

8. A method as in claim 7 further comprising:
selectively forwarding the traffic on the multiple layer 2 network links depending on the ability of the multiple layer 2 network links to forward the traffic.

9. A method as in claim 1 further comprising:
supporting routing of data packets through the multiple layer 2 links between the first data communication device and the second data communication device by advertising a public network address associated with the first data communication device to a number of neighboring data communication devices with respect to the first data communication device; and
limiting advertisement of the layer 3 network addresses to the second data communication device.

10. A method as in claim 1, wherein establishing multiple layer 2 network links between the first data communication device and the second data communication device includes:
for each of the multiple layer 2 network links, configuring a respective layer 2 link in a point-to-point mode in which the respective layer 2 link is not a shared media for broadcasting data.

11. A computer system comprising:
a processor;
a memory unit that stores instructions associated with code executed by the processor; and
an interconnect coupling the processor and the memory unit, enabling the computer system to execute the code and perform operations of:
establishing multiple layer 2 network links between a first data communication device and a second data communication device;
enabling layer 3 network communications over each of the multiple layer 2 network links by establishing a plurality of layer 3 network communications interfaces in the first data communication device, each respective one of the layer 3 network communication interfaces for communication over a corresponding one of the multiple layer 2 network links;
assigning a plurality of layer 3 network addresses to the layer 3 network communications interfaces, each one of the layer 3 network communications interfaces being assigned a different one of the layer 3 network addresses than the other layer 3 network communications interfaces;
monitoring a health status of the multiple layer 2 network links by executing a BFD (Bidirectional Forwarding Detection) session in the first data communication device, the BFD session communicating over the layer 3 network communications interfaces using a BFD protocol, the BFD protocol being a protocol for fault detection;

updating a forwarding table in the first data communication device to indicate traffic routable to the second data communication device is routed over at least one backup layer 3 network communications interface instead of over at least one primary layer 3 network communications interface in response to detecting a failure in at least one of the multiple layer 2 network links with the BRD session, the at least one primary layer 3 network communications interface for communication over the at least one of the multiple layer 2 network links, the layer 3 network communications interfaces including the at least one backup layer 3 network communications interface and the at least one primary layer 3 network communications interface, the forwarding table identifying how to route traffic received by the first data communication device from a network;

receiving at least one data packet from a third data communication device at the first data communication device;

identifying by the first data communication device whether the at least one data packet is routable through the second data communication device to a remote device based on the forwarding table, the remote device being identified by a remote network address in the at least one data packet; and routing the at least one data packet by the first data communication device over at least one backup layer 3 network communications interface based on the forwarding table, wherein routing the at least one data packet includes:

selecting a private layer 3 network address from the forwarding table, the private layer 3 network address being associated with a target layer 3 network communication interface in the second data communication device, the private layer 3 network address being associated with the second data communication device and the at least one backup layer 3 network communications network in the forwarding table, the layer 3 network addresses including the private layer 3 network address; and forwarding the at least one data packet to the private layer 3 network address from the at least one backup layer 3 network communications interface over a corresponding one of layer 2 network links to the target layer 3 network communication interface at the second data communication device.

12. A computer system as in claim 11 configured to further support operations of:

maintaining a plurality of unique Internet Protocol (IP) network addresses as private to the first data communication device and the second data communication device, the layer 3 network addresses including the unique IP network addresses, the unique IP network addresses including the private layer 3 network address.

13. A computer system as in claim 11, wherein enabling layer 3 network communications over each of the multiple layer 2 network links includes:

establishing a first layer 2 network link between the first data communication device and the second data communication device to support primary network layer 3 network communications between the first data communication device and the second data communication device, the at least one of the multiple layer 2 network links including the first layer 2 network link; and establishing a second layer 2 network link between the first data communication device and the second data communication device to support backup layer 3 network communications between the first data communication device and the second data communication device, the second layer 2 network link used for transmitting data packets when the first layer 2 network link fails, the multiple layer 2 network links including the second layer 2 network link, wherein the at least one backup layer 3 network communications interface is for communication over the second layer 2 network link.

14. A computer system as in claim 11 configured to further support operations of:

maintaining the layer 3 network addresses as private layer 3 network addresses; and maintaining a publicly advertised network address associated with each of the first data communication device and the second data communication device.

15. A computer system as in claim 11, wherein selecting the private layer 3 network address includes:

checking the health status associated with the multiple layer 2 network links in the forwarding table;

based on the health status in the forwarding table, identifying that the corresponding one of the layer 2 network links is operating properly for transmission of the at least one data packet over the corresponding one of the multiple layer 2 network links; and selecting the private layer 3 network address associated with the corresponding one of the layer 2 network links.

16. A computer system as in claim 11 wherein monitoring the health status of the multiple layer 2 network links comprises:

monitoring an ability of the multiple layer 2 network links to forward traffic with the BFD session.

17. A computer system as in claim 11 configured to further support operations of:

supporting routing of data packets through the multiple layer 2 links between the first data communication device and the second data communication device by advertising a public network address associated with the first data communication device to at least one neighboring data communication devices that neighbor the first data communication device; and limiting advertisement of the layer 3 network addresses to the second data communication device.

18. A computer system as in claim 11 configured to further support operations of:

for each of the multiple layer 2 network links, configuring a respective layer 2 link in a point-to-point mode in which the respective layer 2 link is not a shared media for broadcasting data.

19. A tangible computer-readable media comprising software, wherein the software, when executed with a processor, is operable to:

establish multiple layer 2 network links between a first data communication device and a second data communication device;

configure a plurality of layer 3 network communications interfaces in the first data communication device, each respective one of the layer 3 network communication interfaces configured for communication over a corresponding one of the multiple layer 2 network links;

assign a plurality of layer 3 network addresses to the layer 3 network communications interfaces, each one of the layer 3 network communications interfaces being assigned a different one of the layer 3 network addresses than the other layer 3 network communications interfaces;

monitor a health status of the multiple layer 2 network links with a BFD (Bidirectional Forwarding Detection) session in the first data communication device, the BFD session in communication with the second data communication over the layer 3 network communications interfaces with a BFD protocol, the BFD protocol being a protocol for fault detection;

update a forwarding table in the first data communication device to route any traffic directed to the second data communication device over a primary layer 3 network communications interface while a first one of the multiple layer 2 network links is operational, wherein the primary layer 3 network communications interface is for communication over the first one of the multiple layer 2 network links, and the primary layer 3 network communications interface is included in the layer 3 network communications interfaces, the forwarding table identifying how to route traffic received by the first data communication device from a third data communication device;

update the forwarding table in the first data communication device to forward traffic to the second data communication device over a backup layer 3 network communications interface in response to detection of a failure in the first one of the multiple layer 2 network links by the BFD session, wherein the backup layer 3 network communications interface is for communication over a second one of the multiple layer 2 network links, and the backup layer 3 network communications interface is included in the layer 3 network communications interfaces; and route at least one data packet received from the third data communication device to a remote network via the second data communication device over at least one of the primary layer 3 network communications interface and the backup layer 3 network communications interface depending on the forwarding table, the remote network identified in the at least one data packet, wherein the software operable to route the at least one data packet is further operable to:

select a private layer 3 network address from the forwarding table, the private layer 3 network address being associated with a target layer 3 network communication interface in the second data communication device, the private layer 3 network address being associated with the second data communication device and the at least one backup layer 3 network communications network in the forwarding table, the layer 3 network addresses including the private layer 3 network address; and forward the at least one data packet to the private layer 3 network address from the at least one backup layer 3 network communications interface over a corresponding one of layer 2 network links to the target layer 3 network communication interface at the second data communication device.

20. The tangible computer-readable medium of claim 19, wherein the BFD session is configured to communicate over the layer 3 network communications interfaces with a second BFD session executed in the second data communication device and the first and second BFD sessions are configured to detect failures in the multiple layer 2 network links.

* * * * *